Aug. 17, 1937.  E. T. FERNGREN  2,090,528

METHOD OF FORMING AND HANDLING DIPPED FORMED ARTICLES

Original Filed Aug. 20, 1932  3 Sheets—Sheet 1

Inventor
Enoch T. Ferngren

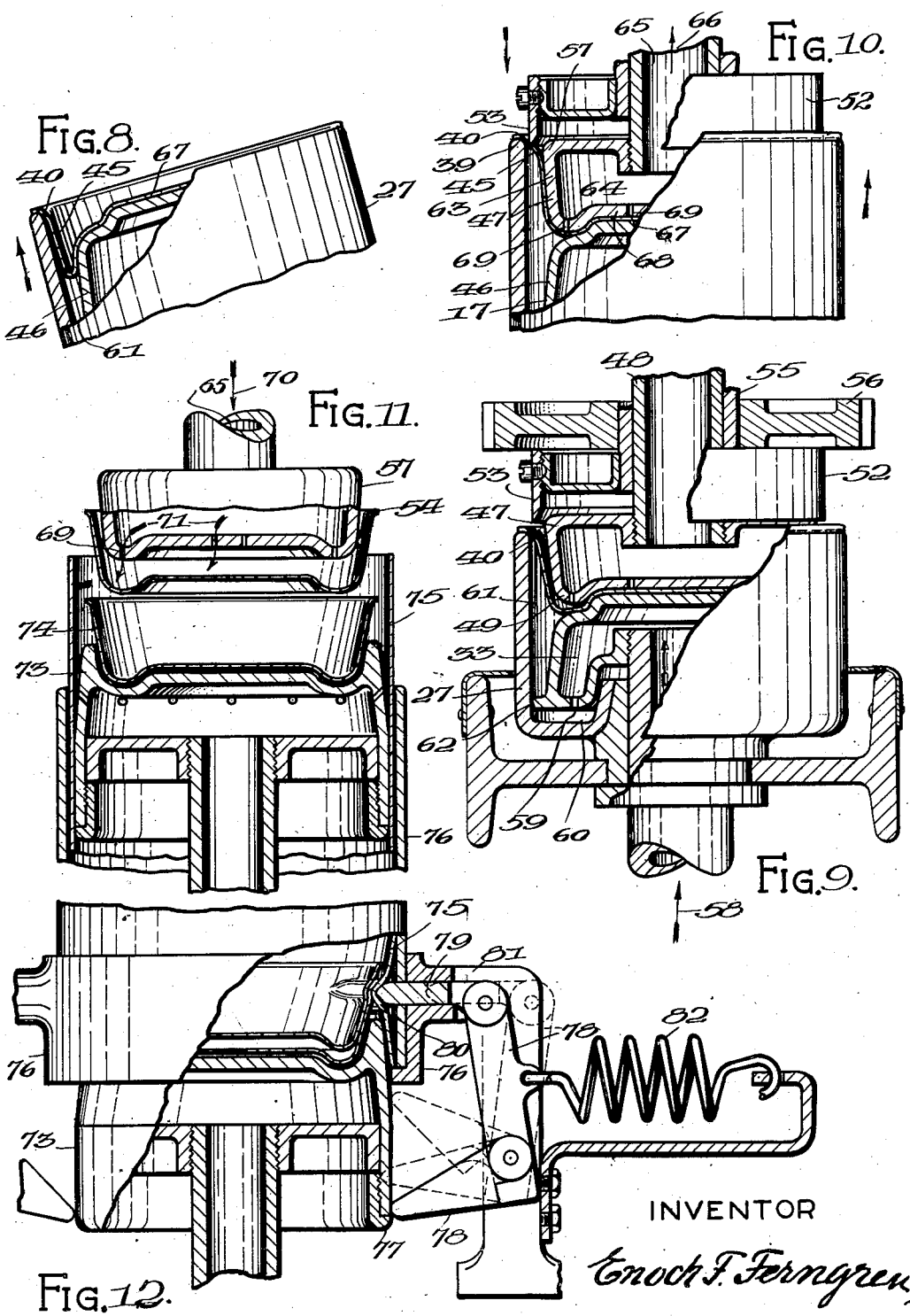

Aug. 17, 1937.　　　　E. T. FERNGREN　　　2,090,528
METHOD OF FORMING AND HANDLING DIPPED FORMED ARTICLES
Original Filed Aug. 20, 1932　　　3 Sheets-Sheet 3
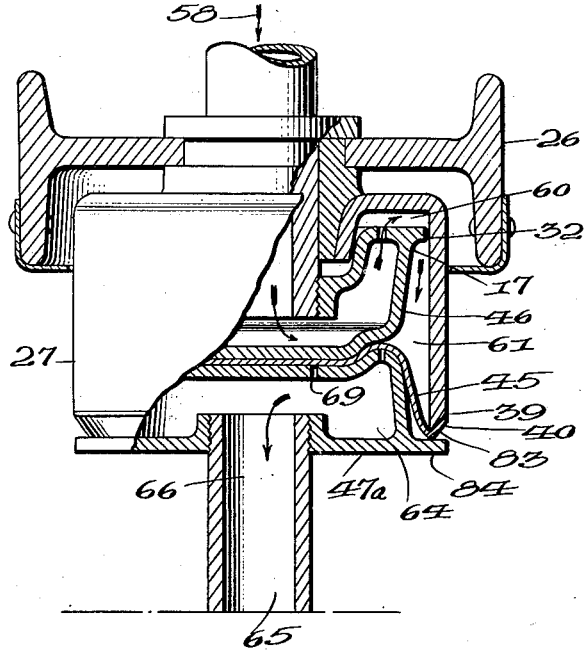
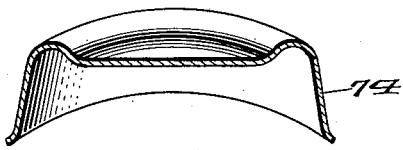
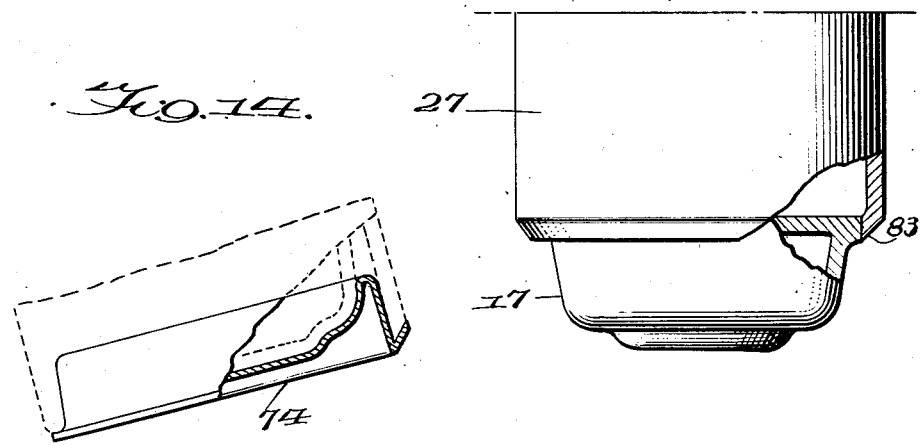
Inventor
Enoch T. Ferngren Patented Aug. 17, 1937

2,090,528

UNITED STATES PATENT OFFICE 2,090,528

METHOD OF FORMING AND HANDLING DIPPED FORMED ARTICLES

Enoch T. Ferngren, Jackson Heights, N. Y., assignor, by mesne assignments, to Plax Corporation, Hartford, Conn., a corporation of Delaware Application August 20, 1932, Serial No. 629,697
Renewed July 1, 1936

15 Claims. (Cl. 18—58)

This invention relates to improvements in the manufacture of film objects made by dipping processes, from various plastics and colloidal solutions or dispersions.

The composition from which dipped form objects are produced may comprise nitro-cellulose and/or cellulose acetate, also other forms of cellulose derivatives to which solvents and plasticizers may be added in suitable proportions to produce solutions or dispersions of viscid nature from which coatings may be obtained by dipping procedure, the coating obtained on the dipping tool forming a solid film thereon when the solvents have been evaporated.

These coatings may be soft, pliable and extensible or relatively hard and brittle depending upon the amount of plasticizers of different nature which are added to the base of the material and the proportions of resins or gums blended therewith. In this relation different solvents should be selected for their particular actions on the various materials blended so as to produce the proper degree of progressive evaporation during the drying of the film, also, all solvents used should be compatible with the materials composing the solution so that practically uniform suspensions and blends may be had. Many formulas are available which will afford sufficient data as to proper compositions with regard to the particular properties required in the film.

Latex compositions likewise form and provide excellent materials for the forming of films with very elastic properties serviceable for many purposes.

The present invention, as to the specific item shown, is directed to the production of petticoat or over-all milk bottle caps, however many other hollow articles may be formed by the process herein brought out.

The successful automatic production of an item such as the milk bottle cap from the materials hereinabove noted by the dipping process depends in a large degree upon the ease and accuracy by which the solidified coating may be removed from the dipping tool, as it is essential that the bottle cap be maintained in its exact molded shape without any distortion or tearing of the film and also, that it be maintained in an open form for nesting and subsequent use. This last is very important for satisfactory handling by automatic machinery during capping of milk bottles.

Aside from other improved methods of procedure herein disclosed the main object of the invention resides in the provision of certain process steps which make possible a perfect removal of the film object in open form from the dipping tool in a uniform shape with a neatly trimmed edge, without the employment of steam, or water in the operation of removing the cap.

In the accompanying drawings,

Figure 8 is a fragmentary view partly in section of the dipping tool showing the position of the film wall as it is being lifted away from the tool.

Figure 9 is a fragmentary view partly in section of all of the parts associated during the removal of the cap.

Figure 10 is an elevational view partly in section showing the parts associated at the instant of completed forming of the film object and the cutting thereof from the stripping member.

Figure 11 is a view in vertical section showing the delivery of caps and their nesting.

Figure 12 is a side elevation partly in section of the mechanism employed during the nesting procedure.

Figure 13 illustrates a modified type of relationship between a stripping device and the forming tool proper.

Figure 1:
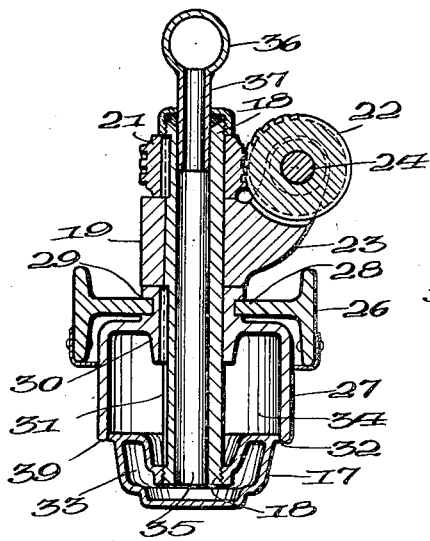
Figure 1 is a vertical section taken through the mechanism employed in carrying out the main feature of the process.
Figure 2:
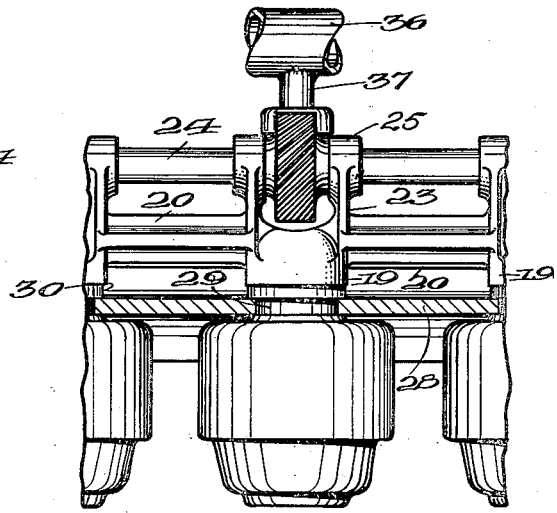
Figure 2 is a fragmentary view principally in side elevation of a plurality of dipping tools and associated mechanism mounted on a common support for simultaneous operation.

Figure 14 indicates the film wall being moved from the dipping tool surface.

Figure 15 is a view partly in elevation and partly in cross section of parts associated in the modified form of the device.

Figure 16 is a perspective view in cross section of the finished cap after removal from the dipping tool.

Illustrating the method steps employed in the several figures only enough of the machine elements are shown which are directly concerned in the process, all other operating parts required not being per se a part of the present invention. Certain of these other elements are disclosed in my copending application, Ser. No. 632,689, filed September 12, 1932, which is in part a continuation of the present invention.

A dipping tool 17 upon which the cap is initially formed is attached to a hollow shaft 18 which is journaled in a hub element 19 of cross arm 20. The shaft 18 is keyed to a spiral gear 21 which is rotated by a spiral gear 22 mounted for rotation in an arm support 23 of hub 19; rotational movement being imparted to the gear 22 by the shaft 24 journaled in hubs 25 at the bifurcated ends of the arm 23.

An I beam cross member 26 which parallels the arm 20 is movably supported from said arm by mechanism adapted to move the beam 26 and a stripping cup 27 along shaft 18 upward or downward along the shaft 18 as may be required, the cup 27 being rotatably mounted with respect to the web portion 28 of the beam 26 by means of a recess 29 which is of annular shape, formed in the hub portion 30 of the cup, so that the cup portion 27, which is splined to the shaft 18 and free to slide vertically thereon by means of the slotted guide way 31, may be free to rotate with the shaft 18 and the dipping tool 17 while being movable downward or upward on the outside of the dipping tool.

The tool 17 and the stripping cup 27 are both cylindrical in shape, the periphery of the tool fitting closely the inside of the cup 27 as shown at 32.

Air may be admitted to the interior space 33 of the dipping tool and the space 34 within the stripping cup 27 by means of the bore 35 in the shaft 18 the air supply being admitted in said bore from a pipe member 36 and nipple 37. This air may be heated or cooled at certain periods during the drying stage or coagulation of the film as may be desired.

Figure 3:
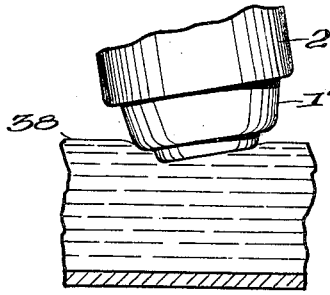
Figures 3, 4 and 5 are fragmentary showings of that portion of the mechanism which is mainly employed as the coating tool showing it in different relationships to the plastic solution during association therewith.
Figure 4:
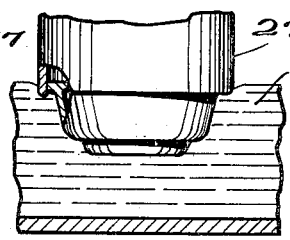

During association of the dipping tools with the plastic solution 38 the tool is initially tilted at an angle such as that indicated in Figure 3 and may be simultaneously rotated during its submersion to a depth such as that indicated in Figure 4. At the instant of completed submersion the lower edge 39 of the cup 27 is moved deeper into the solution by a slight downward movement of the member 26. The object of this movement is to form a film wall coating on the inner surface of the stripping member 27 adjacent to its lower terminus for the purpose of providing a film wall extension from the normal edge portion of the film on the tool 17 which will lie in the direction of subsequent movement of the cup 27. While such film wall coating 40 will be of slight extent, it serves as a bridging membrane between the stripping edge of cup 27 and the upper portion of the film as formed on the tool and because this membrane lies in the plane of stripping movement it effectively prevents injury or premature breaking of the film as the stripping cup moves downward during release of the film from the tool which will be hereafter more fully explained.

Figure 5:
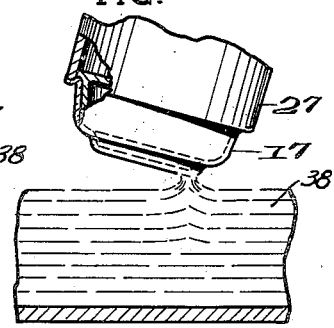
Figure 6:
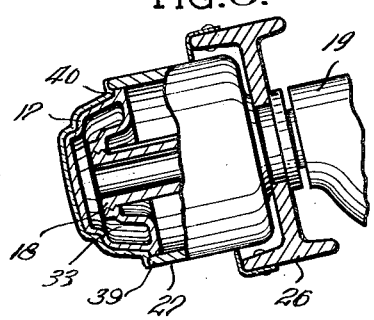
Figure 6 illustrates the angular position of the dipping tool during rotation directly following removal from the plastic solution.
Figure 7:
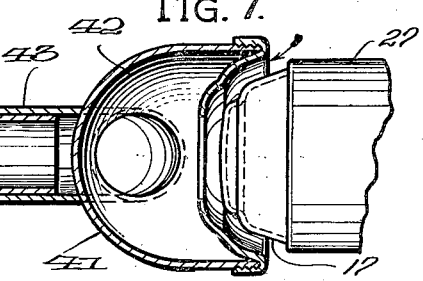
Figure 7 illustrates a suitable position of the tool while it is rotated around its axis during solvent removal from the film and shows an associated drying means in section.

The dipping tool is moved into the position indicated in Figure 5 while emerging from the pool 38 and almost immediately thereafter is brought into the positions shown in Figures 6 and 7 while constantly being rotated in one direction or the other. At this instant the suction member 41 may be located as indicated to cause a movement on air past the film surface of the dipping tool 17, the air being evacuated from the interior space 42 by means of suitable evacuating mechanism operating through suitable connections comprising, for example, conduit parts 43 and 44. The solvents removed from the film may be recovered in the usual fashion by any suitable recovery system.

After the film body on the forming tool has been properly solidified the cup 27 is moved outwardly or downwardly over the forming tool in the direction of the film membrane 40 at the inner edge of the cup, thus causing this film portion 40 to act as a pliant pulling vehicle on the upper edge of the film on the dipping tool, moving the upper film wall section 45 off the tool in the direction of the movement of the cup edge 39 and reversing the film as shown in Figure 8.

As the stripping cup 27 continues to move outwardly the required distance to complete the removal of the film wall portion 45 from the side wall 46 of the dipping tool 17, a hollow receiving head 47 carried by a hollow shaft 48 is moved into the proximity of the film wall on the dipping tool, as shown in Figure 9, the lower end 49 of the receiving head being shaped similarly to the upper bead edge of the mouth of a milk bottle and the cap receiving end of the member 47 being suitably shaped to accommodate the caps being formed, so when film wall 45 has been completely reversed it will also have complete support of form retaining nature. This is best shown in Figure 10 where the film wall is shown as completely reversed and transferred from the dipping tool to the receiving head. At this instant a rotary cutting or trimming member 52 is moved to bring its shearing edge 53 to position to trim or cut the edge wall portion 40 from that portion of the film wall which forms the outwardly turned section 54 (Figure 11) of the finished milk bottle cap.

The cutting knife 52, during association with the film wall, is rotated and also advanced into a penetrating contact with the film body by a movement of the sleeve 55 which carries both the cutting knife 52 and the gear member 56. The gear 56 is intermeshed with adjoining gears all of which rotate together. The mechanism described insures a very clean cutting action on the film as the annular knife edge 53 bears against the stretched or radially tensioned film section which spans the open space between the edge 39 of stripping member 27 and upper wall portion 57 of the receiving head 47. The point where the knife edge 53 cleaves through the film body is approximately where the surplus wall portion 40 joins the film initially formed on the dipping tool 17.

During the outward movement of the stripping cup 27 air is admitted into the hollow interior 33 of the dipping tool as indicated by arrow 58 (Figure 9), this air escaping through the bore 59 into the space 60, the air moving through a clearance space 62 between the outer periphery 32 of the dipping tool and the inner face of the stripping cup 27, into the space 61 rearward of the film wall 45 and assisting in pressing the film wall against the side wall 63 of the hollow receiving head 47 and also providing a pneumatic cushion back of the film as it is being cut by the edge 53.

As this is being accomplished the hollow interior 64 of the receiving head 47 may be evacuated by withdrawing air therefrom through a passage 65 as indicated by the arrow 66. The central portion 67 of the film cap may be firmly attached to the end wall portion 68 of the head 47 by exhausting air trapped therebetween through the passages 69 in the wall 68 to the interior 64 of the head which is evacuated as above set forth, so that when the surplus film 40 is trimmed off, the cap is neatly transferred to the head 47. The head 47 is then moved outwardly from association with the dipping tool 17.

The finished cap carried by the member 47 is now moved to a position as indicated in Figure 11 where the cap is released therefrom by the simple expedient of restoring normal atmospheric pressure in the cavity 64 of the head. Sometimes when the film cap material is inclined to be adhesive in its properties a slight amount of air pressure established in the cavity 64 will operate through the passages 69 forcibly to dislodge the film cap therefrom, the air being introduced through the passage 65 as indicated by the arrow 70 and uniformly concentrically distributed behind the cap structure as indicated by the several arrows 71.

A finished milk bottle cap 74 is thus released from the member 47, at a time when a receiving head 73 or the caps 74 already located on said receiving head are in a position to receive the oncoming caps which are being nested by this procedure in a paper tube 75 held by a concentric cylindrical member 76. The receiving head 73 is caused to recede downward a short distance within the paper tube 75 as each cap is delivered there-into until a certain number of caps have been received in the tube and the head 73 passes out of the holding member 76. At this time the lower end 77 of the receiving head coacts with a crank 78 to cause the indentation of the paper tube 75 by plunger members 79, which are caused to advance and indent the side of the paper tube 75 at 80 as shown in Figure 12, by the forward actuation of the plunger 79 in a slotted member 81. The crank 78 is normally held in a withdrawn position by a tension spring 82, the lower end of the crank being arranged as to freely permit the entry of the member 73 into the casing 76 without becoming operatively active on the plunger 79 as indicated by the dotted lines in the drawings.

Figures 13, 14 and 15 illustrate a slightly simplified arrangement where the lower periphery 39 of the stripping tool 27 is formed as a cutting edge 83 for trimming the film as it is being stripped. The edge 83 cooperates with the flange 84 of the receiving head 47a to trim the edge of the milk bottle cap. The operation in this instance may be performed without any turning movement of the cutting edge, or of the surface 84 of the member 47a. However, the dipping tool and stripping cup may be rotated at the instant of penetration of the edge 83 to the film body 45 which will immediately entirely separate the cap from the dipping tool, all of the parts being otherwise organized as heretofore described. The air employed to facilitate the operation may be heated or cooled as required, as suited to different plastic materials for the purpose of temporarily modifying the extensibility of the film so that it may be properly cohesive and firm in its body structure during handling.

It should be noted that the application of the air and vacuum at different points of the film surface is at all times uniformly distributed with equal pressure concentrically acting on the film and that all mechanical operations are likewise directed to become operative at like points of the film body at the same instant.

The reason for the rotation of the dipping tool 17, at time of submersion into the plastic solution, and the angular approach of the tool, is to prevent inclusion of air at the annular corner formation in the lower face of dipping tool when coating same.

The object of the angular tilt of tool 17 at time of departure from the plastic solution is to quickly drain surplus plastic away from the tool and to promote rapid spreading of the plastic accumulation as the tool is withdrawn from contact with the solution. The reason for depressing the lower edge 39 of the stripping cap 27, when the tool 17 is in dip, is to avoid inclusion of air at the upper end of the film, when coating the inner side of edge 39 and forming the surplus wall 40.

The result of this manipulative treatment of the film body structure of the cap is to remove the same without in any way disturbing or distorting its structure and this process of operation and of treatment can be employed with equal certainty over a wide range of hollow dip formed articles when removing same from dipping tools as may readily be understood by those skilled in the art.

While I have herein shown and described a certain practical embodiment of the invention suitable for carrying out the manipulative steps and treatments thereof I do not limit the method to use only by the particular form of construction herein presented.

Having thus described my invention I desire to claim:—

1. The method of making dip-formed coatings with dipping tools, which comprises rotating a forming tool in plastic film-forming material and simultaneously forming a surplus coating on the inner wall of a stripping member closely adjacent to the dipping tool, such coating being connected with and approximately paralleling the coating on the dipping tool, and then removing the coating from the dipping tool by causing the coating thereon to reverse and follow in the direction of the surplus film as such film is being removed by the stripping member.

2. The method of removing film objects from dipping tools and of uniformly trimming the edge of the film, which comprises creating a surplus film section extending from the film on the dipping tool and about a cutting edge of a cylindrical member, relatively moving the tool in respect to the cylindrical member and thus causing the separation of the film from the tool, and moving the cutting edge of the cylindrical member against a surface distant from the dipping tool to trim the edge of the film formed as aforesaid.

3. The method of producing hollow film articles, comprising the steps of dipping a forming member into a plastic film-forming material, thereafter stripping the formed film from the member by first removing that portion of the film which is to form the side wall of the article, then bringing a receiving head into proximity with the partly stripped film and attaching the receiving head to the unstripped portion of the film, trimming the outer edge of the side wall of the film by the operation of a cutting edge associated with the receiving head, and then completing the removal of the film from the forming member.

4. In the making of hollow film articles by dipping process wherein a film coating is formed and solidified on a dipping tool, the process of removing said film from the tool to produce the article, which comprises using air pressure on one side of the film and vacuum action on the other to move the film away from the tool and during this action shearing the film to produce an edge portion on the article to liberate the same from the tool.

5. In the making of hollow film articles by dipping wherein a film is solidified on a dipping tool, the process of removing the film from the tool to produce the article, which comprises using air pressure on one side of the film and vacuum action on the other side to assist in moving the film away from the tool, supporting the film from its edge and central portion while changing the position of the edge portion relative the central portion, and thereafter cutting the film from its edge support and removing it from the dipping tool.

6. The process of producing hollow articles from solutions of materials in solvents, which comprises submerging a forming implement with the small end foremost and at a constantly changing angle, first, cornerwise into the top layer of such solution while moving successive points of the corner area of the implement rotationally to secure a tangentially sweeping progressive immersion of the foremost surfaces of the implement, then into a perpendicular position to attain the required depth of submersion, thence outward away from the solution while resuming a cornerwise relationship for drainage of material from the implement, arresting the draining by rotating the implement at the speed which will cause a pick-up of the draining material, thereafter varying the angular position of the implement while exposing the coating to suctional action to remove solvents and solidify the material, thereafter progressively reversing the coating by drawing it outward over the implement with its inner side turned outward, and trimming its edge portion and removing it as a hollow article.

7. The method of forming a hood cap with a recess in its top end, which comprises drying a film forming coating on the outside of a forming tool which is shaped to form a film cap with a raised portion at its top end, then shaping the said film to produce the recess at its top end by changing the position of the side portion of the said film on the tool relative to the position of the raised portion, the said shaping consisting in turning the side wall forming film portion and moving it into a position which is the reverse of its prior position relative to the top forming film portion on the tool, then taking the said top film portion for the cap away from the tool without changing its form or reversing its position relative the new position of the said side wall film, and thereby completing the forming of the said cap with a recess in its top end.

8. The method of forming hood caps for bottles which comprises forming a film-body for the cap on a slightly tapered cap-tool which will permit the reversal during removal of the side wall of the said film-body by turning it inside out, forming the cap from said film-body by changing the position of the side wall and shoulder portion of the film-body relative to the top wall section thereof, during such reversal from the tool of the side wall film-body, trimming off and discarding a marginal portion of said side wall film body to form a uniform edge portion for the cap, and during said procedures causing air under pressure to remove the film from contact with the said cap-tool.

9. The method of producing film articles, comprising applying a coating of plastic material to the surface of an implement which has an external shape similar to the required film article and at the same time to the exterior of a reversing means, the surface of which forms a continuation and a substantially parallel concentrically spaced surface to the surface of the implement, solidifying the continuous coating on the said parts, moving the reversing means and the coating thereon outward over the implement, in so doing progressively turning a portion of the said coating on the implement inside out while moving the forward portion thereof to a point beyond the implement, during the final movement of removal while the outer edge of the said reversed coating is supported from the coating formed on the substantially parallel surface of the said medium, severing the coating at the said edge to separate it from the supporting coating, and during said procedure causing air under pressure to impart rigidity to the coating at the line of severance.

10. The method of producing caps for bottles from materials which form cohesive films, which comprises applying a coating of such material to an implement which has the required shape, treating the coating on the implement to obtain a cohesive film structure, moving that portion of film which is to form the side wall of the cap so it will be turned inside out, during this action supporting the reversing film from its outer limits and also from its central portion, releasing the central portion of the film from the said implement by means of air pressure while thus supported, and then trimming the edge of the film and taking it away from the implement as a completed cap.

11. The method of forming caps for bottles which comprises applying a coating of film-forming materials onto the surface of a preliminary former and solidifying it thereat, then forming the cap by the following steps, first by mechanically and pneumatically reversing, freeing and drawing that portion of the coating which forms the side wall of the cap away from the preliminary former, second, by receiving the reversed portion of the coating on a take-off device having the shape of the bottle cap, third, by causing air to operate between that portion of the coating which forms the top portion of the cap and the corresponding portion of the preliminary former while the take-off device is in receiving position and, fourth, by cutting the coating adjacent to its marginal edge to free it from the preliminary former.

12. In the process of removing hollow-film articles from dipping tools, the steps which comprise bending backwardly the peripheral margin of such a film article away from the dipping tool upon which said article was formed and applying air pressure between the film wall and said dipping tool.

13. In the manufacture of hollow-film articles by dipping methods, the process which comprises dipping into a film-forming composition a dipping tool provided with a slidable sleeve forming a stripping member, said tool being dipped in such manner that its end is covered with a film of said composition, said film extending over the end of said slidable sleeve, removing said tool from said composition, at least partially drying said film, moving said slidable sleeve towards the end of said tool, thereby bending backwardly the peripheral margin of said film away from said dipping tool, and applying air pressure in the space between said slidable sleeve, said dipping tool and said peripheral margin of said film.

14. In the process of removing hollow-film articles from dipping tools, the steps which comprise bending backwardly the peripheral margin of such a film article away from the dipping tool upon which said article was formed, applying air pressure between the film wall and said dipping tool, and applying vacuum on the opposite side of the film wall, the air pressure and vacuum jointly assisting in the stripping of the film from the dipping tool.

15. In the process of removing hollow-film articles from dipping tools, the steps which comprise bending backwardly the peripheral margin of such a film article away from the dipping tool upon which said article was formed, and applying vacuum to the opposite side of the film wall from that initially in contact with the dipping tool to assist in the stripping of the film wall from the dipping tool.

ENOCH T. FERNGREN.